United States Patent
Suga

(10) Patent No.: US 10,906,354 B2
(45) Date of Patent: Feb. 2, 2021

(54) PNEUMATIC TIRE

(71) Applicant: The Yokohama Rubber Co., LTD., Tokyo (JP)

(72) Inventor: Yuichi Suga, Hiratsuka (JP)

(73) Assignee: The Yokohama Rubber Co., Ltd.

( * ) Notice: Subject to any disclaimer, the term of this patent is extended or adjusted under 35 U.S.C. 154(b) by 327 days.

(21) Appl. No.: 15/329,214

(22) PCT Filed: Jul. 2, 2015

(86) PCT No.: PCT/JP2015/069139
§ 371 (c)(1),
(2) Date: Jan. 25, 2017

(87) PCT Pub. No.: WO2016/013368
PCT Pub. Date: Jan. 28, 2016

(65) Prior Publication Data
US 2017/0210174 A1  Jul. 27, 2017

(30) Foreign Application Priority Data
Jul. 25, 2014 (JP) .................... 2014-152282

(51) Int. Cl.
  *B60C 11/03* (2006.01)
  *B60C 11/00* (2006.01)
  *B60C 11/13* (2006.01)

(52) U.S. Cl.
  CPC .......... *B60C 11/0083* (2013.01); *B60C 11/00* (2013.01); *B60C 11/03* (2013.01);
  (Continued)

(58) Field of Classification Search
  CPC ............. B60C 11/1376; B60C 11/0083; B60C 11/0304; B60C 11/0318
  See application file for complete search history.

(56) References Cited

U.S. PATENT DOCUMENTS 4,722,378 A * 2/1988 Carolla ............... B60C 11/0302
 152/209.15
4,840,210 A * 6/1989 Kukimoto ................ B60C 3/06
 152/209.9
(Continued)

FOREIGN PATENT DOCUMENTS

CN 103101403 5/2013
CN 103879236 6/2014
(Continued)

OTHER PUBLICATIONS

Machine translation for Japan 2009-161001 (Year: 2018).*
(Continued)

*Primary Examiner* — Steven D Maki
(74) *Attorney, Agent, or Firm* — Thorpe North & Western

(57) ABSTRACT

The present technology provides a pneumatic tire. In a tire meridian cross-sectional view, a profile line (PL1) of a center land portion (X) defined by two center main grooves (14a, 14b) protrudes outward in a tire radial direction further than a standard profile line (PL0). Profile lines (PL2, PL3) of sub-center land portions (Y1, Y2) and shoulder land portions (Z1, Z2) defined outward of the two center main grooves (14a, 14b) in the tire width direction protrude outward in the tire radial direction further than the standard profile line (PL0), the shoulder land portions (Z1, Z2) being defined further outward than the sub-center land portions (Y1, Y2). A pitch count (Po) of a vehicle mounting outer side region and a pitch count (Pi) of a vehicle mounting inner side region satisfy the relationship Po<Pi.

8 Claims, 4 Drawing Sheets

(52) U.S. Cl.
CPC ....... *B60C 11/0304* (2013.01); *B60C 11/0311* (2013.01); *B60C 11/0318* (2013.01); *B60C 11/1376* (2013.01); *B60C 2011/039* (2013.01); *B60C 2011/0388* (2013.01)

(56) References Cited

U.S. PATENT DOCUMENTS

| | | | |
|---|---|---|---|
| 2010/0212792 A1* | 8/2010 | Mita | B60C 11/0306 152/209.9 |
| 2011/0061780 A1* | 3/2011 | Mita | B60C 11/1392 152/209.8 |
| 2013/0118663 A1 | 5/2013 | Kishizoe | |
| 2013/0240100 A1 | 9/2013 | Miyoshi et al. | |
| 2014/0166169 A1* | 6/2014 | Tanaka | B60C 11/1376 152/209.15 |
| 2014/0283965 A1* | 9/2014 | Takahashi | B60C 11/0008 152/209.5 |
| 2015/0075686 A1* | 3/2015 | Suga | B60C 11/1392 152/209.16 |
| 2016/0023516 A1* | 1/2016 | Shima | B60C 11/1376 152/209.1 |
| 2016/0280011 A1* | 9/2016 | Uchida | B60C 11/0083 |
| 2016/0280012 A1* | 9/2016 | Uchida | B60C 11/0083 |
| 2017/0182849 A1* | 6/2017 | Uchida | B60C 11/03 |
| 2017/0217254 A1 | 8/2017 | Suga | |

FOREIGN PATENT DOCUMENTS

| | | |
|---|---|---|
| EP | 114594 A2 * | 8/1984 |
| EP | 3 159 186 | 4/2017 |
| JP | 04-103406 A * | 4/1992 |
| JP | 07-172107 A * | 7/1995 |
| JP | H07-172107 | 7/1995 |
| JP | 2002-029216 | 1/2002 |
| JP | 2009-161001 A * | 7/2009 |
| JP | 2011-225084 | 11/2011 |
| JP | 2013-103620 | 5/2013 |
| JP | 2014-118123 | 6/2014 |
| WO | WO-2013/141261 A1 * | 9/2013 |
| WO | WO-2015/064248 A1 * | 5/2015 |
| WO | WO-2015/068605 A1 * | 5/2015 |
| WO | WO 2015/194402 | 12/2015 |

OTHER PUBLICATIONS

Machine translation for Japan 07-172107 (Year: 2018).*
Machine translation for Japan 04-103406 (Year: 2018).*
Machine translation for EP 114594 (Year: 2018).*
First Inventor to File (FITF) Comprehensive Training (Year: 2019).*
International Search Report for International Application No. PCT/JP2015/069139 dated Aug. 4, 2015, 4 pages, Japan.

* cited by examiner

PNEUMATIC TIRE

TECHNICAL FIELD

The present technology relates to a pneumatic tire with steering stability performance, anti-noise/vibration performance, and uneven wear resistance performance enhanced in a well-balanced manner.

BACKGROUND ART

To enhance steering stability performance, conventionally, the land portion width of a tread portion is made large so as to ensure tread rigidity. However, an excessively large land portion width results in reduced ground contact pressure at the center position in the tire width direction of the land portion. Accordingly, both end portions in the tire circumferential direction at approximately the center position deform inward toward the land portion. As a result, the footprint length is shortened causing contact with the ground and steering stability performance to be degraded.

Technology relating to enhancement of steering stability performance accompanying enhanced contact with the ground is known (see Japanese Unexamined Patent Application Publication No. 2002-029216A). In such technology, straight-line stability performance, a kind of steering stability performance, is enhanced by forming a land portion in a curved shape protruding outward in the tire radial direction.

As described in Japanese Unexamined Patent Application Publication No. 2002-029216A, by forming a land portion in a curved shape protruding outward in the tire radial direction, contact with the ground is enhanced. Note that the method of determining the curved shape described in Japanese Unexamined Patent Application Publication No. 2002-029216A employs one type of road contact surface profile line extending over the whole of the tread surface in the tire width direction.

In recent years, development of a pneumatic tire having superior steering stability performance as well as superior anti-noise/vibration performance and uneven wear resistance performance has been in demand.

SUMMARY

The present technology provides a pneumatic tire with steering stability performance, anti-noise/vibration performance, and uneven wear resistance performance enhanced in a well-balanced manner.

A pneumatic tire of the present technology includes on either side of a tire equatorial plane in a tire width direction, one center main groove extending in a tire circumferential direction, one shoulder main groove extending in the tire circumferential direction outward from the center main groove in the tire width direction, and five land portions extending in the tire circumferential direction, the land portions being defined by the four main grooves.

In a tire meridian cross-section of the pneumatic tire, a curved line including at least two of four both end points of the two center main grooves in the tire width direction is defined as a standard profile line. A profile line of a center land portion defined by the two center main grooves protrudes outward in the tire radial direction further than the standard profile line. Profile lines of sub-center land portions and shoulder land portions defined outward of the two center main grooves in the tire width direction protrude outward in the tire radial direction further than the standard profile line. The shoulder land portions are defined further outward than the sub-center land portions. Further, the profile lines of the sub-center land portions and the shoulder land portions each include an outermost point of the corresponding center main groove in the tire width direction and both end points of the corresponding shoulder main groove in the tire width direction, and are present on either side of the tire equatorial plane in the tire width direction. A pitch count Po of the vehicle mounting outer side region and a pitch count Pi of the vehicle mounting inner side region satisfy the relationship Po<Pi.

In the pneumatic tire according to the present technology, the profile lines of the land portions defined in the tread portion, and the pitch count of each vehicle mounting side region are enhanced. As a result, a pneumatic tire according to the present technology can enhance steering stability performance, anti-noise/vibration performance, and uneven wear resistance performance in a well-balanced manner.

BRIEF DESCRIPTION OF DRAWINGS

FIG. 3A illustrates a form of a conventional pneumatic tire and FIG. 3B illustrates a form of the pneumatic tire of the present embodiment.

DETAILED DESCRIPTION

The following is a detailed description of embodiments of a pneumatic tire according to the present technology (hereinafter, referred to as the Basic Embodiment and Additional Embodiments 1 to 3), based on the drawings. Note that these embodiments are not intended to limit the present technology. The constituents of the embodiments include constituents that can be easily replaced by those skilled in the art and constituents substantially the same as the constituents of the embodiments. In addition, the various embodiments included in the embodiments can be combined as desired within the scope of obviousness by a person skilled in the art.

Basic Embodiment

A basic embodiment of the pneumatic tire according to the present technology will now be described. In the following description, "tire radial direction" refers to a direction orthogonal to the axis of rotation of a pneumatic tire; "inward in the tire radial direction" refers to a direction toward the axis of rotation in the tire radial direction; and "outward in the tire radial direction" refers to a direction away from the axis of rotation in the tire radial direction. "Tire circumferential direction" refers to the circumferential direction with the axis of rotation as the center axis. Furthermore, "tire width direction" refers to a direction parallel to the axis of rotation; "inward in the tire width direction" refers to a direction toward a tire equatorial plane (tire equatorial line) in the tire width direction; and "outward in the tire width direction" refers to a direction away from the tire equatorial plane in the tire width direction. Note that "tire equatorial plane" refers to a plane that is orthogonal to the axis of rotation of the pneumatic tire and that passes through the center of the pneumatic tire along the width thereof.

Figure 1:
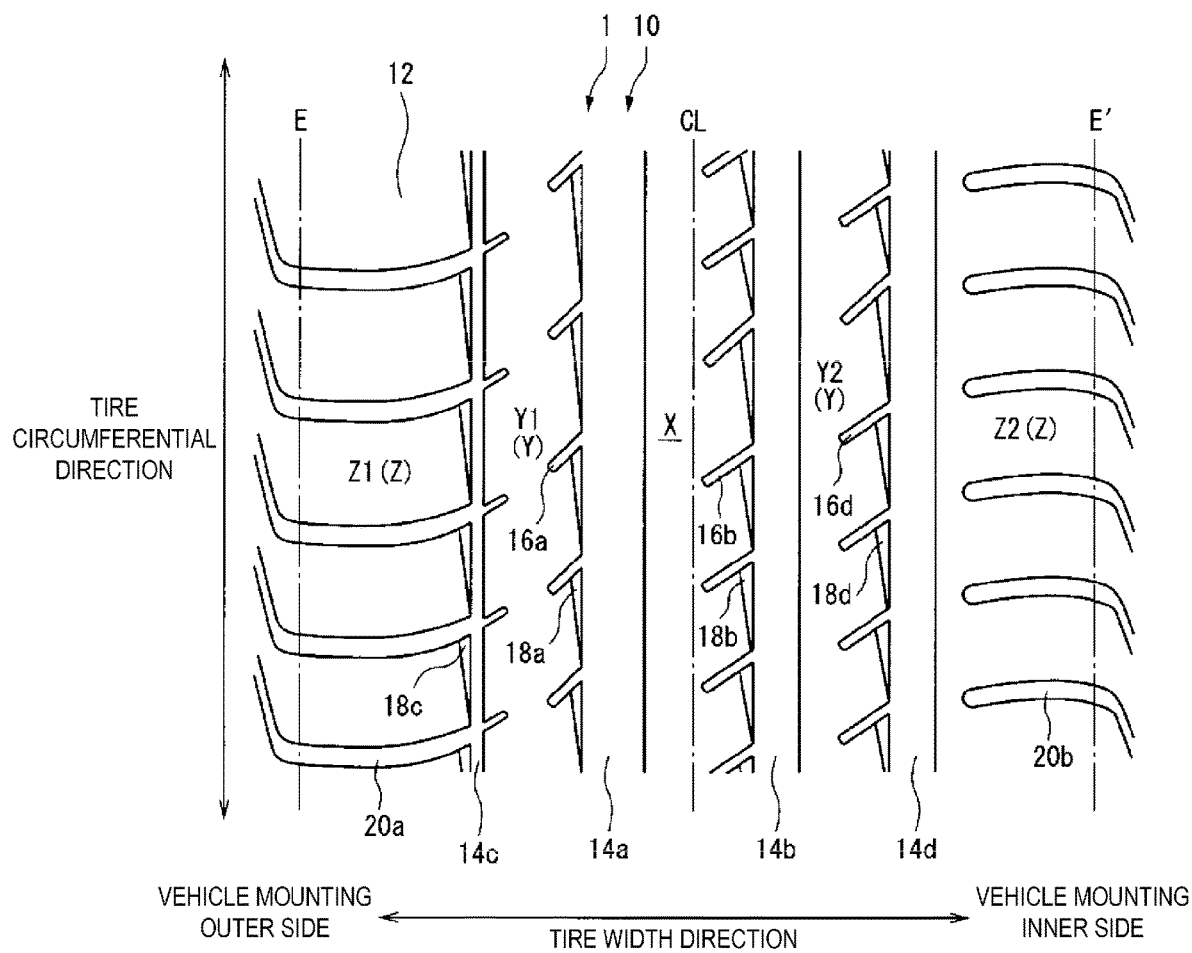
FIG. 1 is a plan view of a tread surface of a pneumatic tire according to an embodiment of the present technology.

FIG. 1 is a plan view of a tread surface of a pneumatic tire according to an embodiment of the present technology. Note that in FIG. 1, the reference sign CL denotes the tire equatorial plane, and the reference signs E, E' denote ground contact edge lines of the pneumatic tire. Also to note is that the tread pattern illustrated in FIG. 1 is a pattern with the sides on either side of the tire equatorial plane CL in the tire width direction being asymmetrical.

A tread portion 10 of a pneumatic tire 1 is formed from a rubber material (tread rubber) and is exposed on the outermost side of the pneumatic tire 1 in the tire radial direction. The surface of the tread portion 10 constitutes the contour of the pneumatic tire 1. The surface of the tread portion 10 forms a tread surface 12 that is a surface that comes into contact with the road surface when a vehicle (not illustrated) on which the pneumatic tire 1 is mounted is driven.

The tread surface 12, as illustrated in FIG. 1, is provided with four circumferential grooves 14a, 14b, 14c, 14d extending in the tire circumferential direction separated by a predetermined interval in the tire width direction. The circumferential grooves 14a, 14c are formed on a vehicle mounting outer side of the tire equatorial plane CL, and the circumferential grooves 14b, 14d are formed on a vehicle mounting inner side. Hereinafter, the circumferential grooves 14a, 14b may be referred to as "center main grooves," and the circumferential grooves 14c, 14d may be referred to as "shoulder main grooves."

Note that in the present embodiment, the circumferential grooves 14a to 14d are not limited to being grooves that extend in the tire circumferential direction in a linear manner as illustrated in FIG. 1 and may extend in the tire circumferential direction in a wave-like or zigzag-like manner having an amplitude in the tire width direction.

Further, inclined grooves 16a (16b, 16d) are provided at a fixed pitch on the tread surface 12 in the tire circumferential direction. Each inclined groove 16a extends from the circumferential groove 14a (14b, 14d) toward the vehicle mounting outer side in the same direction as the tire circumferential direction, and terminates inside a land portion. Note that a chamfered portion 18a(18b, 18d) is formed in each position where the circumferential groove 14a (14b, 14d) and the inclined groove 16a (16b, 16d) come into contact.

Furthermore, as illustrated in FIG. 1, lug grooves 20a (20b), each extending across the ground contact edge line E (E'), are provided to the tread surface 12 at a fixed pitch in the tire circumferential direction. Note that the lug grooves 20a provided to the vehicle mounting outer side extend across the shoulder main groove 14c as well, and a chamfered portion 18c is formed in each position where the shoulder main groove 14c and the lug groove 20a come into contact.

Accordingly, in the present embodiment, five land portions (center land portion X, sub-center land portions Y1, Y2, and shoulder land portions Z1, Z2) are defined by the grooves 14a, 14b, 14c, 14d, 16a, 16b, 16c, 20a, 20b. Note that the center land portion X, the sub-center land portions Y1, Y2, and the shoulder land portion Z2 are each a so-called rib, and the shoulder land portion Z1 is a block group formed by a large number of blocks.

Figure 2:
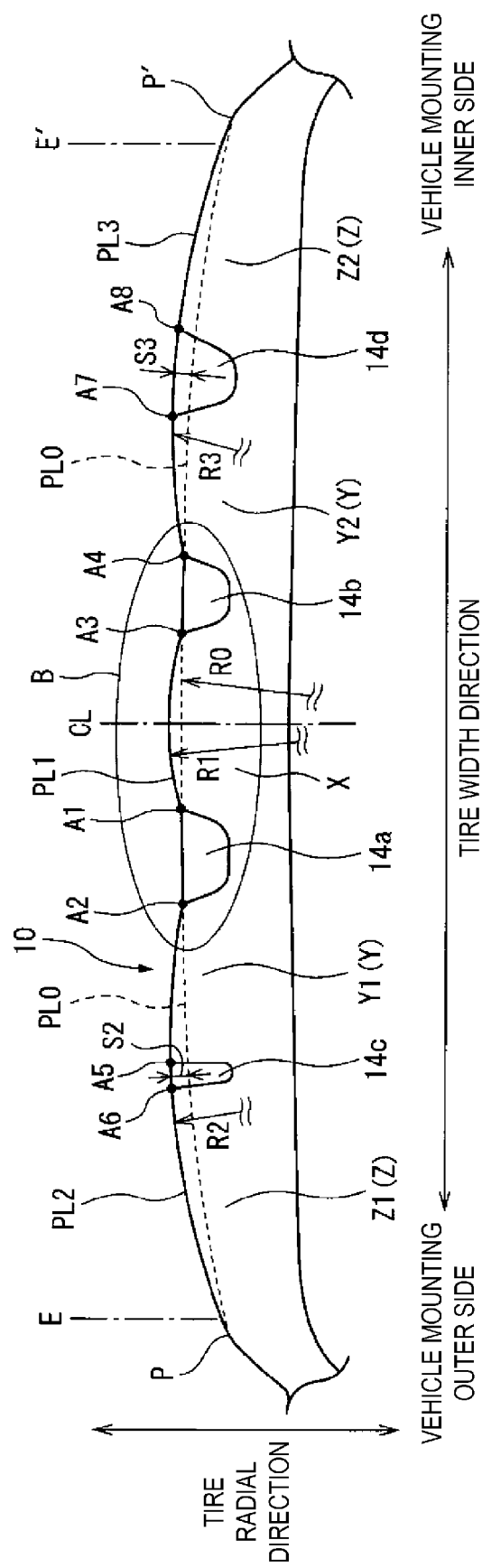
FIG. 2 is a tire meridian cross-sectional view of a tread portion of the pneumatic tire illustrated in FIG. 1.

FIG. 2 is a tire meridian cross-sectional view of the tread portion of the pneumatic tire illustrated in FIG. 1. Components in FIG. 2 that share reference signs with those in FIG. 1 denote the same member.

As illustrated in FIG. 2, both end points of the center main grooves 14a, 14b in the tire width direction are taken as A1, A2, A3, A4, and both end points of the shoulder main grooves 14c, 14d in the tire width direction are taken as A5, A6, A7, A8.

Then, a curved line including at least two of the four both end points A1 to A4 of the two center main grooves 14a, 14b in the tire width direction is defined as a standard profile line PL0. Examples of selection of the at least two of four points include a combination of the two points A1, A3 near the tire equatorial plane CL, a combination of the two points A2, A4 away from the tire equatorial plane, and a combination of all four of these points as in the example illustrated in FIG. 1. The standard profile line PL0 may be a circular arc, an elliptical arc, or any other kind of curved line.

When defined as such, in the present embodiment, as illustrated in FIG. 2, profile line PL1 of the center land portion X defined by the two center main grooves 14a, 14b protrudes outward in the tire radial direction further than the standard profile line PL0.

Next, as illustrated in FIG. 2, on either side of the tire equatorial plane CL in the tire width direction, a curved line including the outermost point A2 (A4) of the center main groove 14a (14b) in the tire width direction and the end points A5, A6 (A7, A8) of the shoulder main groove 14c (14d) in the tire width direction is taken as profile line PL2 (PL3). The profile line PL2 (PL3) is a profile line shared by the sub-center land portion Y1 (Y2) and the shoulder land portion Z1 (Z2) defined outward of the center main groove 14a (14b) in the tire width direction, the shoulder land portion Z1 (Z2) defined even further outward than the sub-center land portion Y1 (Y2).

Further, in the present embodiment, as illustrated in FIG. 2, the profile line PL2 (PL3) protrudes outward in the tire radial direction further than the standard profile line PL0.

Further, in the present embodiment, a pitch count Po of the vehicle mounting outer side region and a pitch count Pi of the vehicle mounting inner side region satisfy the relationship Po<Pi. Here, the pitch count in each vehicle mounting side region refers to the number of lug grooves in the tire circumferential direction disposed in the land portion positioned on the outermost side in the tire width direction of each region. That is, as illustrated in FIG. 1, the pitch count in each vehicle mounting side region is the number of lug grooves 20a, 20b in the tire circumferential direction disposed in each of the shoulder land portions Z1, Z2. Further, the vehicle mounting outer side region is the region from the tire equatorial plane CL to the ground contact edge line E of the region illustrated in FIG. 1, and the vehicle mounting inner side region is the region from the tire equatorial plane CL to the ground contact edge line E' of the region illustrated in FIG. 1.

Actions

In the present embodiment, as illustrated in FIG. 2, the profile line PL1, the profile line PL2, and the profile line PL3 protrude outward in the tire radial direction further than the standard profile line PL0, and the relationship Po<Pi is satisfied as illustrated in FIG. 1. As a result, the following effects are obtained.

Figure 3A:
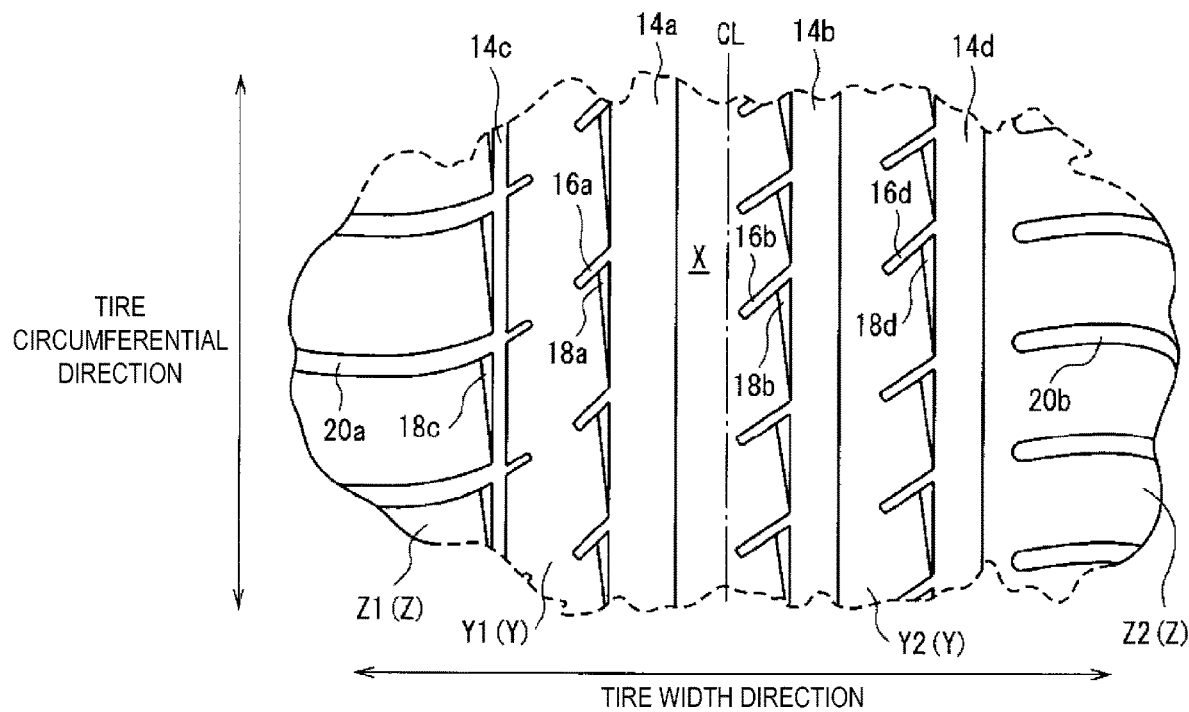
FIGS. 3A and 3B are plan views illustrating ground contact patch forms of pneumatic tires.
Figure 3B:
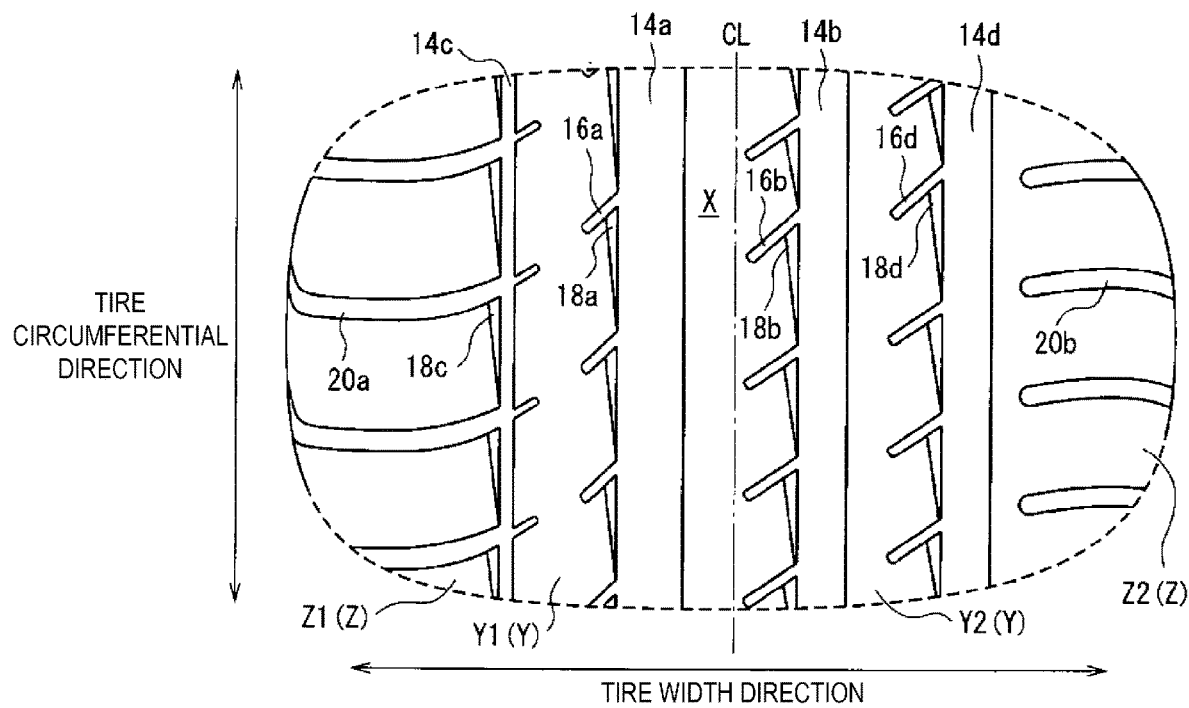

FIGS. 3A and 3B are plan views illustrating ground contact patch forms of pneumatic tires. Note that FIG. 3A illustrates a form of a conventional pneumatic tire, and FIG. 3B illustrates a form of the pneumatic tire of the present embodiment illustrated in FIGS. 1 and 2. In other words, while the tread pattern of FIG. 3A is the same as the tread pattern illustrated in FIG. 1 (in a plan view), the profile lines PL1, PL2, PL3 illustrated in FIG. 2 all match the standard profile line PL0.

In other words, in the conventional pneumatic tire, the profile lines PL1, PL2, PL3 illustrated in FIG. 2 all match the standard profile line PL0. Accordingly, due to the low ground contact pressure of the land portions at the center positions in the tire width direction, both end portions in the tire circumferential direction at approximately the center positions deform inward toward the land portions, as illustrated in FIG. 3A. Thus, the peripheral line of the ground contact patch takes an uneven shape (see in particular the dotted areas in FIG. 3A). The uneven shape of the peripheral line causes a footprint length in the land portions at approximately the center positions in the tire width direction to be shortened. This in turn adversely affects contact with the ground and steering stability performance.

In comparison, in the pneumatic tire of the present embodiment, the profile lines PL1, PL2, PL3 illustrated in FIG. 2 protrude in the tire radial direction past the standard profile line PL0. Thus, the ground contact pressure of the land portions at approximately the center positions in the tire width direction can be made substantially the same as the ground contact pressure at both outer positions in the tire width direction. Accordingly, it is possible to suppress deformation inward toward the land portions in both end portions in the tire circumferential direction at approximately the center positions. As a result, as illustrated by the dotted line in FIG. 3B, the boundaries of the end portions of the land portions X, Y1, Y2, Z1, Z2 (applicable to both the leading edge and the trailing edge) in the tire circumferential direction are positioned on one smooth curved line, in relation to the ground contact surface. This allows for the footprint length of the land portions X, Y1, Y2, Z1, Z2 in the tire width direction to be substantially uniform compared to the example illustrated in FIG. 3A, thus enhancing contact with the ground (Action 1).

Further, in the present embodiment, there is particular significance to setting the one profile line PL2 (PL3) ranging across the sub-center land portion Y1 (Y2) and the shoulder land portion Z1 (Z2), or in other words, positioning the outer contour of the sub-center land portion Y1 (Y2) and the outer contour of the shoulder land portion Z1 (Z2) on the same curved line, as illustrated in FIG. 2.

In other words, by setting the one profile line PL2 (PL3) ranging across the sub-center land portion Y1 (Y2) and the shoulder land portion Z1 (Z2), the contact with the ground in the tire width direction of the sub-center land portion Y1 (Y2) and the shoulder land portion Z1 (Z2) can be enhanced. Additionally, when the sub-center land portion Y1 (Y2) and the shoulder land portion Z1 (Z2) are considered as a whole, the amount of deformation in the tire width direction of the contact with the ground can be smoothly transferred amongst these land portions, and in particular, the contact with the ground of the outer shoulder regions in the tire width direction can be sufficiently enhanced (Action 2).

Furthermore, in the present embodiment, satisfaction of the relationship Po<Pi makes it possible to comparatively increase the pitch count (that is, dispose a comparatively large number of lug grooves in the tire circumferential direction) in the vehicle mounting inner side region, which contributes highly to anti-noise/vibration performance comparatively large, and thus disperse noise and vibration (Action 3). Further, satisfaction of the Po<Pi relationship makes it possible to comparatively decrease the pitch count (that is, dispose a comparatively small number of lug grooves in the tire circumferential direction) on the vehicle mounting outer side, which contributes highly to steering stability performance and the like, and thus increase land portion rigidity (Action 4).

Thus, in the pneumatic tire of the present embodiment, contact with the ground in the tire width direction of the land portions is increased (Action 1), contact with the ground between the sub-center land portion and the shoulder land portion is increased (Action 2), and the number of lug grooves in the vehicle mounting outer side region is comparatively decreased, increasing land portion rigidity (Action 4). According to the pneumatic tire of the present embodiment, Actions 1, 2, and 4 are combined, making it possible to achieve superior steering stability performance (including both straight-line performance and turning performance; including, for example, lane changing ease) as well as superior uneven wear resistance performance.

Further, in the pneumatic tire of the present embodiment, the number of lug grooves in the vehicle mounting inner side region is comparatively increased, making it possible to disperse the noise and vibration (Action 3) and thus achieve superior anti-noise/vibration performance.

Thus, according to the pneumatic tire of the present embodiment, with the combined Actions 1 to 4 above, the steering stability performance, anti-noise/vibration performance, and uneven wear resistance performance can be achieved in a well-balanced manner.

Although it is not illustrated in the drawings, the pneumatic tire according to the present embodiment described above has a meridian cross-section shape similar to that of a conventional pneumatic tire. Here, the meridian cross-section shape of the pneumatic tire refers to the cross-sectional shape of the pneumatic tire on a plane normal to the tire equatorial plane. As seen in the tire meridian cross-section, the pneumatic tire according to the present embodiment includes bead portions, sidewall portions, shoulder portions, and the tread portion from inside to outside in the tire radial direction. As seen, for example, in the tire meridian cross-section, the pneumatic tire is provided with a carcass layer that extends from the tread portion to the bead portions on both sides and is wound around a pair of bead cores, and a belt layer and a belt reinforcing layer upon the carcass layers in that order outward in the tire radial direction.

The pneumatic tire according to the present embodiment can be obtained via ordinary manufacturing steps; i.e., a tire material mixing step, a tire material machining step, a green tire molding step, a vulcanization step, a post-vulcanization inspection step, and the like. In particular, when manufacturing the pneumatic tire according to the present embodiment, for example, recesses and protrusions corresponding to the grooves and land portions formed in the tread portion illustrated in FIGS. 1 and 2 are formed on the inner wall of the vulcanization mold, which is used for vulcanization.

Note that in the pneumatic tire of the present embodiment, the following method is used to determine, in particular, the profile lines PL1, PL2, PL3 illustrated in FIG. 2.

In other words, first, the shape of the standard profile line PL0 is determined. For example, when the standard profile line PL0 is a circular arc, the radius of curvature is determined. For the radius of curvature, it is important to set various values according to the tire size. In the present embodiment, the radius of curvature is a dimension from 5 to 20 times that of the cross-sectional height of the tire.

Then, the circular arc PL0 with a radius of curvature R0 including at least two of the four both end points A1, A2, A3, A4 of the two center main grooves 14*a*, 14*b* in the tire width direction (point A1 and point A3, for example) and having a center position on the tire equatorial plane CL is determined.

Next, the circular arc PL1 with a radius of curvature R1 including the inner points A1, A3 of the two center main grooves 14a, 14b in the tire width direction is determined, the radius of curvature R1 being less than the radius of curvature R0 of the circular arc PL0 ($0.3 \leq R1/R0 \leq 0.4$).

Lastly, the circular arc PL2 (PL3) with a radius of curvature R2 (R3) including the point A2 (A4) on the outer side of the two center main grooves 14a (14b) in the tire width direction is determined, the radius of curvature R2 (R3) being less than the radius of curvature R0 of the circular arc PL0 ($0.75 \leq R2$ (R3)/$R0 \leq 0.95$). The circular arc PL2 (PL3) extends from the point A2 (A4) beyond the ground contact edge line E (E') outward in the tire width direction and intersects the circular arc PL0 at point P (P').

Note that the circular arc PL1 and the circular arc PL2 (PL3) intersect in the tire width direction region of the circumferential groove 14a (14b) near the tire equatorial plane CL. Additionally, the point P (P') is positioned further outward in the tire width direction from the ground contact edge line E (E') by a dimension from 3% to 5% the tire ground contact width.

When the standard profile line PL0 is a circular arc and the radius of curvature of the circular arc is 5 times or greater than the cross-sectional height of the tire, the standard profile line PL0 itself can be prevented from protruding excessively in the tire radial direction. Thus, the radius of curvature of the profile lines PL1, PL2, PL3 that protrude outward in the tire radial direction further than the standard profile line PL0 need not be set excessively low to achieve sufficient enhancement of the contact with the ground of the land portions. When the radius of curvature described above is 20 times or less than the cross-sectional height of the tire, the standard profile line PL0 itself can protrude sufficiently in the tire radial direction. Thus, the radius of curvature of the profile lines PL1, PL2, PL3 that protrude outward in the tire radial direction further than the standard profile line PL0 can be set sufficiently low to achieve sufficient enhancement of the contact with the ground of the land portions.

After the shape of the standard profile line PL0 (radius of curvature when a circular arc) is determined as such, at least two of both end points A1 to A4 of the center main grooves 14a, 14b in the tire width direction on the standard profile line PL0 are determined. Then, as illustrated in FIG. 2, the profile line PL1 of the center land portion X is determined together with the profile line PL2 (PL3) ranging across the sub-center land portion Y1 (Y2) and the shoulder land portion Z1 (Z2).

Additional Embodiments

Next, Additional Embodiments 1 to 3 are described that can optionally be implemented on the Basic Embodiment of the pneumatic tire according to the present technology as described above.

Additional Embodiment 1

In the Basic Embodiment, the profile line PL1 of the center land portion X illustrated in FIG. 2 preferably has a maximum protruding amount outward in the tire radial direction with respect to the standard profile line PL0 of from 0.2 to 0.5 mm (Additional Embodiment 1).

Figure 4:
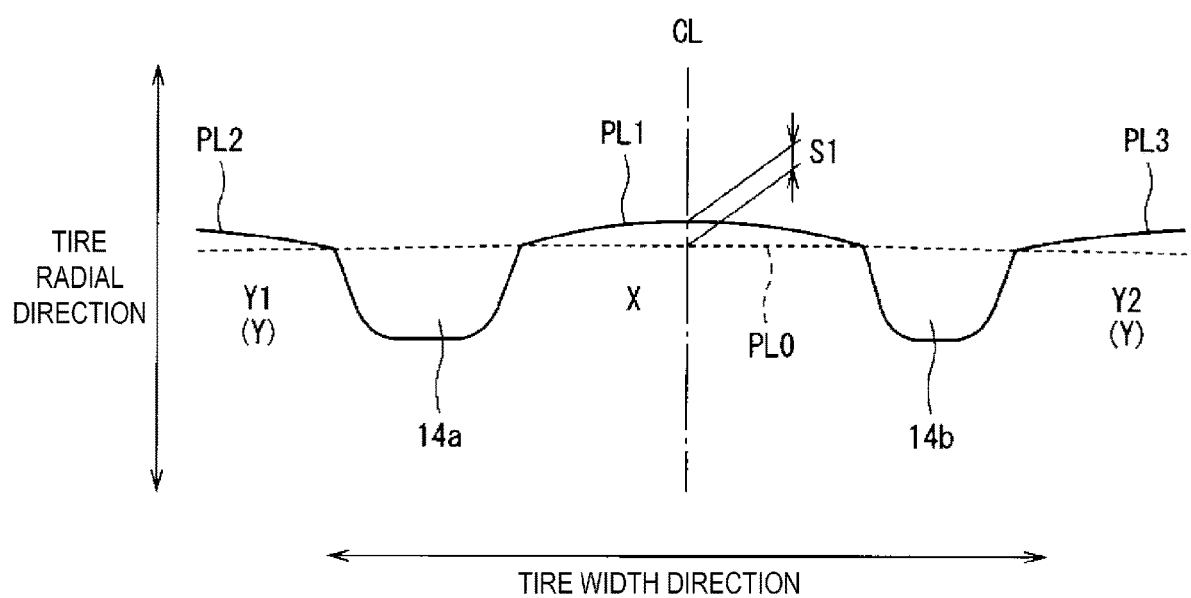
FIG. 4 is an enlarged view of the circled area B of FIG. 2.

FIG. 4 is an enlarged view of the circled area B of FIG. 2. In the present embodiment, as illustrated in FIG. 4, the profile line PL1 of the center land portion X has a maximum protruding amount S1 outward in the tire radial direction with respect to the standard profile line PL0. The maximum protruding amount S1 is the maximum dimension in the tire radial direction from the standard profile line PL0 to the profile line PL1.

When the maximum protruding amount S1 is 0.2 mm or greater, in the center land portion X, the ground contact pressure at approximately the center position in the tire width direction can be made even closer to the ground contact pressure at both outer positions in the tire width direction. Accordingly, gripping force to the road surface can be enhanced, and in particular, steering characteristics when traveling straight are enhanced and straight-line performance (steering stability performance) can be further enhanced.

Additionally, when the maximum protruding amount S1 is 0.5 mm or less, in the center land portion X, the protruding amount in the tire radial direction at approximately the center position in the tire width direction can be suppressed. Thus, the amount of wear at approximately the center position is not excessive compared to the amount of wear at other positions, and uneven wear resistance performance can be further enhanced.

Note that when the maximum protruding amount S1 is from 0.3 to 0.4 mm, the effects described above can be obtained at an even higher level.

Additional Embodiment 2

In Basic Embodiment and Basic Embodiment with Additional Embodiment 1 applied, as illustrated in FIG. 2, the profile line PL2 (PL3) of the sub-center land portion Y1 (Y2) and the shoulder land portion Z1 (Z2) preferably has a maximum protruding amount S2 (S3) outward in the tire radial direction with respect to the standard profile line PL0 of from 0.6 to 2.0 mm; additionally, the profile line PL2 on the vehicle mounting inner side and the profile line PL3 on the vehicle mounting outer side preferably have different maximum protruding amounts S2 (S3) (Additional Embodiment 2).

When the maximum protruding amount S2 (S3) is 0.6 mm or greater, in the sub-center land portion Y1 (Y2) and the shoulder land portion Z1 (Z2), the ground contact pressure at approximately the center position in the tire width direction can be made even closer to the ground contact pressure at both outer positions in the tire width direction. Accordingly, gripping force to the road surface can be enhanced, and in particular, steering characteristics when traveling straight are enhanced and straight-line performance (steering stability performance) can be further enhanced.

Additionally, when the maximum protruding amount S2 (S3) is 2.0 mm or less, in the sub-center land portion Y1 (Y2) and the shoulder land portion Z1 (Z2), the protruding amount in the tire radial direction at the center position in the tire width direction can be suppressed. Thus, the amount of wear at approximately the center position is not excessive compared to the amount of wear at other positions, and uneven wear resistance performance can be further enhanced.

Note that when the maximum protruding amount S2 (S3) is from 0.9 to 1.7 mm, the effects described above can be obtained at an even higher level.

Additionally, in the present embodiment, the maximum protruding amounts S2 (S3) of the profile line PL2 on the vehicle mounting inner side and the profile line PL3 on the vehicle mounting outer side are made to differ. That is, in the present embodiment, for example, the degree of protrusion of the land portions on the vehicle mounting outer side having a significant amount of wear during cornering (the sub-center land portion Y1 and the shoulder land portion Z1) can be intentionally set comparatively low to suppress the amount of wear. In such a case, the tire from the start to end of its service life does not differ greatly in terms of the amount of wear at the land portions on the vehicle mounting outer side and inner side, thus uneven wear resistance performance can be further enhanced.

Additional Embodiment 3

In Basic Embodiment and Basic Embodiment with at least one of Additional Embodiments 1 and 2 applied, preferably the pitch count Po on the vehicle mounting outer side and the pitch count Pi on the vehicle mounting inner side satisfy the relationships $50 \leq Pi \leq 100$ and $30 \leq Po \leq 80$ (Additional Embodiment 3).

Setting the pitch count Pi on the vehicle mounting inner side to 50 or greater makes it possible to sufficiently dispose the lug grooves in the vehicle mounting inner side region, which readily impacts anti-noise/vibration performance in particular, further disperse the noise and vibration, and thus further increase anti-noise/vibration performance. Further, setting the pitch count Pi on the vehicle mounting inner side to 100 or less makes it possible to further ensure land portion rigidity, and thus further increase steering stability performance without excessively disposing lug grooves in the vehicle mounting inner side region.

On the other hand, setting the pitch count Po on the vehicle mounting outer side to 30 or greater makes it possible to sufficiently dispose the lug grooves in the vehicle mounting outer side region as well, further disperse the noise and vibration, and thus further increase anti-noise/vibration performance. Further, setting the pitch count Po on the vehicle mounting outer side to 80 or less makes it possible to further ensure land portion rigidity, and thus further increase steering stability performance without excessively disposing lug grooves in the vehicle mounting outer side region as well.

Note that when the pitch count Pi on the vehicle mounting inner side and the pitch count Po on the vehicle mounting outer side indicated above are respectively set so that $60 \leq Pi \leq 80$ and $50 \leq Po \leq 70$, each of the effects described above can be exhibited at a higher level.

EXAMPLES

Pneumatic tires of Examples 1 to 6 were manufactured with a tire size of 235/40ZR18 (95Y) and included a tread pattern similar to the tread pattern illustrated in FIG. 1 and the profile lines PL1, PL2, PL3 of the tread surface illustrated in FIG. 2 (FIG. 4). Note that the profile lines of the tread surface of the pneumatic tires of Examples 1 to 6 had details with the conditions indicated in Table 1 below.

Additionally, pneumatic tires of a conventional example were manufactured with a tire size of 235/40ZR18 (95Y) and had the same configuration as the pneumatic tires of Example 1 except that the profile lines PL1, PL2, PL3 of the tread surface illustrated in FIG. 2 coincided with the standard profile line PL0.

The test tires thus manufactured for Examples 1 to 6 and the conventional example were assembled to 18×8.5J rims, set to an air pressure of 230 kPa, and fitted to a sedan type passenger vehicle with an engine displacement of 2000 cc. Evaluation was carried out on steering stability performance 1 (straight-line performance), steering stability performance 2 (turning performance), anti-noise/vibration performance, and uneven wear resistance performance.

Steering Stability Performance 1 (Straight-line Performance)

On a dry road surface, performance evaluation was carried out on vehicle stability when traveling straight. Then, the results were expressed as index values for evaluation with the result for the conventional example being defined as the reference (100). Higher index values indicate better steering stability performance 1 (straight-line performance).

Steering Stability Performance 2 (Turning Performance)

On a dry road surface, performance evaluation was carried out on vehicle stability when turning. Then, the results were expressed as index values for evaluation with the result for the conventional example being defined as the reference (100).

In the evaluation, higher index values indicate better steering stability performance 2 (turning performance).

Anti-Noise/Vibration Performance

Using the above test vehicle, pass-by noise was measured on the basis of the acceleration noise test method defined in the ISO 362 pass-by noise performance standard. Then, the results were expressed as index values for evaluation with the result for the conventional example being defined as the reference (100). In the evaluation, higher index values indicate better anti-noise/vibration performance.

Uneven Wear Resistance Performance

After traveling for 1000 km on a dry road surface, the amount of wear of the center land portion X and the shoulder land portion Z1 (Z2) were measured. For the shoulder land portions, the amount of wear on both sides in the tire width direction were averaged, then an amount of wear ratio between the center land portion and the shoulder land portion was calculated. Then, index evaluation was performed on the basis of the measured results using the conventional example as a reference (100). In the evaluation, higher index values indicate better uneven wear resistance performance.

The results are shown in Table 1-1 and Table 1-2.

TABLE 1-1

|  | Conventional example | Example 1 | Example 2 | Example 3 |
|---|---|---|---|---|
| Maximum protruding amount S1 (mm) illustrated in FIG. 4 | 0 | 0.1 | 0.35 | 0.35 |
| Maximum protruding amount S2 (mm) illustrated in FIG. 2 | 0 | 0.5 | 0.5 | 1.2 |
| Maximum protruding amount S3 (mm) illustrated in FIG. 2 | 0 | 0.5 | 0.5 | 1.4 |
| Relationship between pitch count Po of vehicle mounting outer side region and pitch count Pi of | Po < Pi | Po < Pi | Po < Pi | Po < Pi |

TABLE 1-1-continued

|  | Conventional example | Example 1 | Example 2 | Example 3 |
|---|---|---|---|---|
| vehicle mounting inner side region |  |  |  |  |
| Pitch count Po | 25 | 25 | 25 | 25 |
| Pitch count Pi | 40 | 40 | 40 | 40 |
| Pitch variation presence/absence | Absent | Absent | Absent | Absent |
| (Corresponding figure) | (FIG. 1) | (FIG. 1) | (FIG. 1) | (FIG. 1) |
| Steering stability performance 1 (straight-line performance) | 100 | 101 | 105 | 105 |
| Steering stability performance 2 (turning performance) | 100 | 103 | 103 | 110 |
| Anti-noise/vibration performance | 100 | 100 | 100 | 100 |
| Uneven wear resistance performance | 100 | 100 | 103 | 105 |

TABLE 1-2

|  | Example 4 | Example 5 | Example 6 |
|---|---|---|---|
| Maximum protruding amount S1 (mm) illustrated in FIG. 4 | 0.35 | 0.35 | 0.35 |
| Maximum protruding amount S2 (mm) illustrated in FIG. 2 | 1.2 | 1.2 | 1.2 |
| Maximum protruding amount S3 (mm) illustrated in FIG. 2 | 1.4 | 1.4 | 1.4 |
| Relationship between pitch count Po of vehicle mounting outer side region and pitch count Pi of vehicle mounting inner side region | Po < Pi | Po < Pi | Po < Pi |
| Pitch count Po | 35 | 25 | 35 |
| Pitch count Pi | 40 | 60 | 60 |
| Pitch variation presence/absence | Absent | Absent | Absent |
| (Corresponding figure) | (FIG. 1) | (FIG. 1) | (FIG. 1) |
| Steering stability performance 1 (straight-line performance) | 105 | 105 | 105 |
| Steering stability performance 2 (turning performance) | 110 | 113 | 110 |
| Anti-noise/vibration performance | 95 | 100 | 103 |
| Uneven wear resistance performance | 105 | 105 | 105 |

According to Table 1-1 and Table 1-2, the pneumatic tires of Examples 1 to 6 affiliated with the technical scope of the present technology (enhanced profile line of the land portions defined by the tread portion, and enhanced pitch count of the tread portion) were each found to have steering stability performances 1, 2, anti-noise/vibration performance, and uneven wear resistance performance enhanced in a well-balanced manner compared to the pneumatic tire of the conventional example not affiliated with the technical scope of the present technology.

The invention claimed is:

1. A pneumatic tire, comprising
on each of both sides of a tire equatorial plane in a tire width direction,
one center main groove extending in a tire circumferential direction, one shoulder main groove extending in the tire circumferential direction outward from the center main groove in the tire width direction, and five land portions extending in the tire circumferential direction, the land portions being defined by the four main grooves;
in a tire meridian cross-section,
a curved line including at least two of four both end points of the two center main grooves in the tire width direction being defined as a standard profile line;
a profile line of a center land portion defined by the two center main grooves protruding outward in a tire radial direction further than the standard profile line;
profile lines of sub-center land portions and shoulder land portions defined outward of the two center main grooves in the tire width direction protruding outward in the tire radial direction further than the standard profile line, the shoulder land portions being defined further outward than the sub-center land portions, and the profile lines of the sub-center land portions and the shoulder land portions each including an outermost point of the corresponding center main groove in the tire width direction and both end points of the corresponding shoulder main groove in the tire width direction, and being present on either side of the tire equatorial plane in the tire width direction; and
a pitch count Po of a vehicle mounting outer side region and a pitch count Pi of a vehicle mounting inner side region satisfying the relationship Po<Pi; wherein
one of the center main grooves is positioned on a vehicle mounting outer side and the other of the center main grooves is positioned on a vehicle mounting inner side;
the one shoulder main groove on either side of the tire equatorial plane in the tire width direction includes a narrower width shoulder main groove positioned on the vehicle mounting outer side, the narrower width shoulder main groove having a narrower width than a wider width shoulder main groove positioned on the vehicle mounting inner side;
the sub-center land portions are ribs;
a plurality of lateral grooves that is disposed in the center land portion only communicates with the center main groove positioned in the vehicle mounting inner side and does not communicate with the tire equatorial plane; and
a maximum protruding amount of the profile line on the vehicle mounting inner side is greater than a maximum protruding amount of the profile line on the vehicle mounting outer side.

2. The pneumatic tire according to claim 1, wherein the profile line of the center land portion has a maximum protruding amount outward in the tire radial direction with respect to the standard profile line of from 0.2 to 0.5 mm.

3. The pneumatic tire according to claim 2, wherein the profile lines of the sub-center land portions and the shoulder land portions have a maximum protruding amount outward in the tire radial direction with respect to the standard profile line of from 0.6 to 2.0 mm, the maximum protruding amount of the profile line on the vehicle mounting inner side and the maximum protruding amount of the profile line on the vehicle mounting outer side being different.

4. The pneumatic tire according to claim 3, wherein the pitch count Po on the vehicle mounting outer side and the pitch count Pi on the vehicle mounting inner side satisfy the relationships 50≤Pi≤100 and 30≤Po≤80.

5. The pneumatic tire according to claim 1, wherein the profile lines of the sub-center land portions and the shoulder land portions have a maximum protruding amount outward in the tire radial direction with respect to the standard profile line of from 0.6 to 2.0 mm, the maximum protruding amount of the profile line on the vehicle mounting inner side and the maximum protruding amount of the profile line on the vehicle mounting outer side being different.

6. The pneumatic tire according to claim 1, wherein the pitch count Po on the vehicle mounting outer side and the pitch count Pi on the vehicle mounting inner side satisfy the relationships 50≤Pi≤100 and 30≤Po≤80.

7. The pneumatic tire according to claim 1, wherein the center main groove positioned in the vehicle mounting inner side is narrower than the center main groove positioned in the vehicle mounting outer side.

8. The pneumatic tire according to claim 1, wherein the four main grooves are substantially linear.

* * * * *